Patented Jan. 9, 1951

2,537,921

UNITED STATES PATENT OFFICE 2,537,921

POLYMERS OF ESTERS OF OXYGEN-HETEROCYCLIC CARBINOLS

Curtis W. Smith, Berkeley, Calif., assignor to Shell Development Company, San Francisco, Calif., a corporation of Delaware No Drawing. Application September 27, 1948, Serial No. 51,483

20 Claims. (Cl. 260—86.1)

This invention relates to new compositions of matter and to a process for their preparation. More particularly, the present invention relates to novel polymers of polymerizable unsaturated organic compounds, to new compositions of matter from which polymers of the invention may be prepared, and to a process for the preparation of the novel polymers.

An object of the invention is new compositions of matter and a process for their preparation. Novel polymerizable compositions of matter and a process for accomplishing their polymerization to obtain novel and useful polymers are further objects of the invention. A still further object of the invention is to provide novel polymers of esters of ethylenic carboxylic acids with dihydropyranyl-substituted carbinols, and to provide a process for the preparation of the novel polymers. Novel polymers of esters of dihydropyranyl-substituted carbinols with dihydropyran carboxylic acids form particular objects of the invention, and a process for the preparation of novel polymers by condensing dihydropyran aldehydes to esters of dihydropyran carboxylic acids with dihydropyranyl-substituted carbinols and polymerizing such esters to produce valuable new polymers, the process conducted while retaining the reactants and intermediates at all stages in liquid phase, is a still further object of the invention. Improved molding and casting compositions and hard formed objects comprising novel polymers of the invention constitute additional objects of the invention. An improved transparent colorless thermostable resin is a specific object of the invention. Still further objects of the invention will become apparent hereinafter.

There have been prepared valuable new polymers in accordance with the invention by polymerizing polymerizable ethylenic carboxylic acid esters of carbinols having a dihydropyranyl ring nucleus directly attached to the carbon atom of the carbinol group, and by copolymerizing such esters with other polymerizable ethylenic compounds. The substituted carbinols, ethylenic carboxylic acid esters of which are polymerized according to the invention, have directly attached to the carbon atom of the carbinol group a dihydropyranyl ring nucleus, which nucleus may in turn be substituted, as by one or more hydrocarbon groups, or which in accord with a preferred aspect of the invention, may be the unsubstituted dihydropyranyl ring nucleus, or group. The carbon atom of the carbinol group preferably is unsubstituted other than by the dihydropyranyl ring or group; that is, ethylenic carboxylic acid esters of dihydropyranyl-substituted primary carbinols preferably are employed as monomeric esters for the preparation of the improved polymers of the invention.

More specifically, monomeric esters from which polymers are prepared in accordance with the invention have structures that may be described by the generic formula

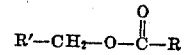

In this formula, R' represents a dihydropyranyl ring nucleus, which may be substituted, particular reference being made to the 2-($\Delta^5$-dihydropyranyl) group and its substitution products obtained by replacement of one or more of the hydrogen atoms attached to the nuclear carbon atoms by a hydrocarbon group or by hydrocarbon groups, and the acyl group

is the acyl residue of an ethylenic carboxylic acid. The 2-($\Delta^5$-dihydropyranyl) group is that radical that has the structure represented by the formula

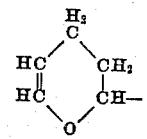

and in its substitution products one or more of the hydrogen atoms may have been replaced by a hydrocarbon group or by hydrocarbon groups, such as by one or more alkyl group or groups. Suitable hydrocarbon groups which may be bonded to the nuclear carbon atoms of the 2-($\Delta^5$-dihydropyranyl) nucleus include aliphatic hydrocarbon groups, such as alkyl groups (examples thereof being methyl, ethyl, propyl, isopropyl, butyl, tert-butyl, n-pentyl, neo-pentyl, hexyl, and the like as well as suitable substitution products thereof), cycloaliphatic hydrocarbon groups, such as cycloalkyl groups (e. g., cyclopentyl, cyclohexyl, methylcyclohexyl, ethylcyclopentyl, etc.), as well as aryl groups of the benzene series (examples thereof including phenyl, tolyl, xylyl, phenethyl, benzyl, p-methoxyphenyl and the like). Since the presence of unsaturation of the aliphatic type (as contrasted to aromatic unsaturation) in substituents, if any, attached to carbon atoms of the 2-($\Delta^5$-dihydropyranyl) ring nucleus tends to interfere with the formation of polymers having the desired properties, as by the presence of an additional polymerizable group in the monomeric ester molecule, such substituents, if any, preferably contain only saturated aliphatic carbon-to-carbon bonds and/or aromatic carbon-to-carbon bonds.

The present invention is predicated upon the discovery that polymerizable ethylenic carboxylic acid esters of 2-($\Delta^5$-dihydropyranyl) primary carbinols may be polymerized to provide improved polymers having advantageous characteristics and being of wide utility. One group of ethylenic carboxylic acid esters of 2-($\Delta^5$-dihydropyranyl) carbinols which may be employed as monomers for preparation of novel polymers according to the invention is composed of the ethylenic carboxylic acid esters of 2-($\Delta^5$-dihydropyranyl) carbinol. The esters of this group may be described by the more specific formula

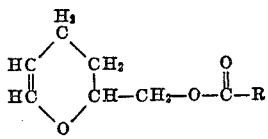

in which the acyl group

represents the acyl residue of a polymerizable ethylenic carboxylic acid. Polymers, more fully described hereinafter, which have been prepared from monomeric esters described by this formula have been notable for their transparency and when suitably prepared by their freedom from color. The added desirable characteristic of substantially complete indifference of the fully polymerized polymers to all of the common organic solvents tested, makes these transparent products that have been thus prepared, useful in a wide variety of applications in which these attributes are desirable. Furthermore, the novel polymers may be prepared at reasonable cost, which is a prerequisite to extensive commercial utilization at the present time.

Another group of esters which may be polymerized in accordance with the invention corresponds in structure to the formula

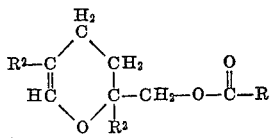

in which $R^2$ represents an aliphatic hydrocarbon group, such as an alkyl group, and the acyl group

has its hereinbefore stated significance. Alkyl groups which may be represented by $R^3$ include, among others, the following: methyl, ethyl, propyl, iso-propyl, butyl, sec-butyl, tert-butyl, the pentyl groups, the hexyl groups, the heptyl groups, the octyl groups, the nonyl groups, and even the decyl, the dodecyl, and the tetradecyl groups.

It was stated above that the esters that have been polymerized in accordance with the invention to obtain useful polymers are polymerizable ethylenic carboxylic acid esters of the above-described dihydropyranyl carbinols, and that in the foregoing formulas the acyl group

represents the acyl residue of the polymerizable ethylenic carboxylic acid. The ethylenic carboxylic acids, generically speaking, are those carboxylic acids which contain at least one pair of carbon atoms of the aliphatic type (as contrasted to carbon atoms of the aromatic type, that is, carbon atoms embraced in an aromatic cycle, or ring) directly interconnected by an aliphatic-type carbon-to-carbon double bond. Preferably the ethylenic carboxylic acid is one devoid of polymerizable groups other than the ethylenic carbon-to-carbon double bond. The following are illustrative examples of ethylenic carboxylic acids acyl residues of which may be represented by

aliphatic ethylenic carboxylic acids, preferably those containing a vinylidine group ($CH_2=C<$) (such as the alpha-methylene aliphatic carboxylic acids, e. g., acrylic acid, methacrylic acid, alpha-chloroacrylic acid, alpha-ethylacrylic acid, alpha-propylacrylic acid, alpha-tert-butylacrylic acid, alpha-bromoacrylic acid, and alpha-neopentylacrylic acid), as well as aliphatic ethylenic carboxylic acids containing ethylenic unsaturation in a position more remote from the carboxyl group and/or having substituents bonded to both ethylenic carbon atoms (for example, crotonic acid, alpha-ethyl-beta-methylacrolein, 3-hexene-1-oic acid, 3-octene-1-oic acid, 4-octene-1-oic acid, alpha-ethylcrotonic acid, and 2,5-dimethyl-2-hepten-7-oic acid), cycloaliphatic ethylenic carboxylic acids (such as cyclohexene-1-carboxylic acid and cyclopentene-1-carboxylic acid), aromatic vinylic carboxylic acids (e. g., alpha-phenylacrylic acid, p-vinylbenzoic acid, p-allylbenzoic acid, and cinnamic acid), and ethylenic carboxylic acids containing a heterocyclic ring, such as an unsaturated oxygen-heterocyclic or sulfur- or nitrogen-heterocyclic ring. The acyl residue may contain one or more substituent groups or atoms attached to the hydrocarbon group represented by R, such as one or more of the following:

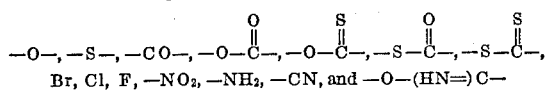

According to the invention, especially valuable polymers have been prepared by polymerization of monomeric esters containing directly linked to the carbon atom of the carbonyl group an unsaturated heterocyclic group having the same nuclear structure as the dihydropyranyl group that is bonded to the carbon atom of the esterified carbinol group of the dihydropyranyl-substituted carbinol. Solid polymers of such ethylenic heterocyclic carboxylic acid esters of the hereinbefore and hereinafter described dihydropyranyl-substituted carbinols have been found to be of especial interest because of their excellent thermostability, their desirable freedom from color when suitably prepared, and their chemical inertness. Liquid stable polymers having improved characteristics also may be prepared from monomeric esters of this preferred subgroup. Monomeric esters from which such particularly desirable polymers have been prepared according to the invention are described more specifically by the formula

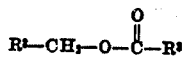

in which both $R^3$'s represent 2-($\Delta^5$-dihydropyranyl) ring nuclei, particularly, the 2-($\Delta^5$-dihydropyranyl) group or a substituted 2-($\Delta^5$-dihydropyranyl) group. The groups represented by $R^3$, if substituted, may be substituted alike, or they may be differently substituted. Preferred esters, if substituted in the dihydropyranyl groups, have alkyl groups attached at the No. 2 and the No. 5 positions of the respective nuclei, and may be otherwise unsubstituted.

A valuable subgroup of polymerizable esters which have been polymerized in accordance with the invention are described by the formula

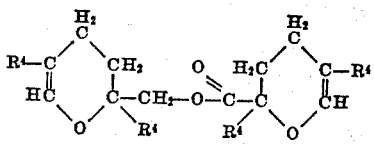

in which each $R^4$ represents an alkyl group. These polymerizable esters are new compositions of matter, and while in themselves useful and valuable compositions of matter, they are of especial value in the polymeric form. They may be prepared in good yields and at low cost from readily available raw materials, and they may be polymerized according to the invention to provide useful new and improved polymers. Preferred polymers prepared by polymerization of esters having structures defined by the last-given formula are soluble viscous liquids to soft-solids, characterized by their excellent color characteristics, i. e., freedom from color, and their stability, as at increased temperatures, and their resistance to the action of chemical agents.

Illustrative esters having structures represented by the above formula are as follows:

2 - (2,5 - dimethyl-$\Delta^5$-dihydropyranyl) methyl 2,5-dimethyl-$\Delta^5$-dihydropyran-2-carboxylate, 2 - (2,5-diethyl-$\Delta^5$-dihydropyranyl) methyl 2,5-diethyl-$\Delta^5$-dihydropyranyl-2-carboxylate, 2-(2,5 - dipropyl - $\Delta^5$ - dihydropyranyl) methyl 2,5-dipropyl-$\Delta^5$-dihydropyranyl-2-carboxylate, 2 - (2,5-diisopropyl-$\Delta^5$-dihydropyranyl) methyl 2,5-diisopropyl-$\Delta^5$-dihydropyranyl-2-carboxylate, 2-(2,5-dibutyl-$\Delta^5$-dihydropyranyl) methyl 2,5-dibutyl-$\Delta^5$-dihydropyran-2-carboxylate, 2 - (2,5-diisobutyl-$\Delta^5$-dihydropyranyl) methyl 2,5-diisobutyl - $\Delta^5$ - dihydropyranyl-2-carboxylate.

2 - (2,5 - di - tertiary - butyl-$\Delta^5$-dihydropyranyl) methyl 2,5 - di-tertiary-butyl-$\Delta^5$-dihydropyranyl-2-carboxylate, 2 - (2,5 - dipentyl-$\Delta^5$-dihydropyranyl) methyl 2,5-dipentyl-$\Delta^5$-dihydropyranyl-2-carboxylate, 2 - (2,5 - dihexyl-$\Delta^5$-dihydropyranyl) methyl 2,5-dihexyl-$\Delta^5$-dihydropyranyl-2-carboxylate, 2 - (2,5 - dioctyl - $\Delta^5$ - dihydropyranyl) methyl 2,5-dioctyl-$\Delta^5$-dihydropyran-2-carboxylate, 2 - (2,5 - didecyl - $\Delta^5$ - dihydropyranyl) methyl 2,5-didecyl-$\Delta^5$-dihydropyranyl-2-carboxylate.

Of particular interest, because of the optical clarity, freedom from color, thermostability, mechanical strength, and chemical inertness which therein may be attained, are solid insoluble polymers that have been prepared according to the invention by polymerizing the ester identified as 2-($\Delta^5$-dihydropyranyl) methyl $\Delta^5$-dihydropyran-2-carboxylate and having the structure represented by the formula

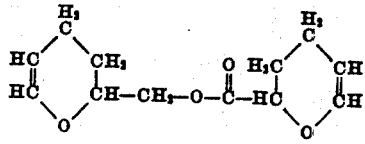

Monomeric esters of ethylenic carboxylic acids with 2-($\Delta^5$-dihydropyranyl) carbinols which are polymerized in accordance with the invention may be prepared by any applicable known method for the preparation of esters, for example, by direct esterification of the appropriate dihydropyranyl carbinol or derivative with the appropriate ethylenic carboxylic acid or derivative, e. g., acid halide, by ester interchange, or by like suitable methods. Suitable dihydropyranyl-substituted carbinols may be prepared by treating substituted $\Delta^5$-dihydropyran-2-carboxaldehydes having a substituent group in addition to the formyl group bonded to the carbon atom in position No. 2 of the dihydropyran ring, with a strong alkali, as disclosed in the copending application Serial No. 713,455, filed December 2, 1946, now Patent Number 2,479,283 August 16, 1949. An excess of an alkali metal hydroxide, preferably in the form of a 20% to 50% aqueous solution, is mixed with the substituted dihydropyran-2-carboxaldehyde, and the mixture is allowed to stand, preferably with agitation, while the temperature thereof is kept preferably within the range of about 15° C. to about 80° C., and desirably above about 40° C., until the reaction is substantially completed. A side-product of the reaction, formed in addition to the desired substituted dihydropyranyl carbinol is the corresponding dihydropyran-2-carboxylic acid. The desired dihydropyranyl carbinol may be separated from the reaction mixture by applicable procedures, such as distillation, extraction with a selective solvent, and thereafter esterified to produce the desired ester according to hereinbefore mentiond or other suitable procedures.

While various methods thus are available for the preparation of monomeric esters suited for the preparation of polymers of the invention, preferred procedure comprises condensing to esters $\Delta^5$ - dihydropyran - 2 - carboxaldehydes, which may or may not be substituted, by action thereon in liquid phase of a lower alcoholate of a polyvalent metal of the second period of the periodic table of the elements, preferably an aluminum lower alkoxide, such as aluminum ethoxide, aluminum propoxide, aluminum isopropoxide, aluminum butoxide, aluminum pentoxide, or aluminum hexoxide. Condensation of the $\Delta^5$-dihydropyran-2-carboxaldehydes to esters of $\Delta^5$-dihydropyran-2-carbinols with $\Delta^5$-dihydropyran-2-carboxylic acids may be effected simply by mixing therewith in liquid phase a small amount of the said alcoholate under substantially anhydrous conditions and maintaining the mixture at room temperatures or somewhat above, say from 20° C. up to about 70° C., until the desired condensation has occurred. The extent of the reaction at any given time may be judged conveniently on the basis of the aldehyde content (which decreases as the condensation reaction progresses) or of the ester content (which increases as the reaction progresses) of the reaction mixture measured according to known applicable methods. Surprisingly small amounts of the polyvalent metal alcoholate are effective for bringing about the desired condensation reaction. As little as 0.05% by weight of the alcoholate, based on the weight of the dihydropyran-2-carboxaldehyde, is effective, and amounts within the range of from about 0.1% to about 4% generally are entirely adequate. The alcoholate of said polyvalent metal, e. g., the aluminum alkoxide, may be employed in the form of a solution in a suitable inert solvent, e. g., one devoid of hydroxyl, or it may be used as such, e. g., in the essentially pure solid state.

Inert solvents may be present during the condensation of the dihydropyran carboxaldehyde, although the condensation proceeds to give high yields of the desired ester even in the absence of added solvents. Suitable inert solvents which may be present include, for example, hydrocarbon solvents, halogenated hydrocarbon solvents, esters, ketones, ethers, etc.

It has been unexpectedly discovered in accordance with the invention that the mixtures resulting from the condensation of $\Delta^5$-dihydropyran-2-carboxaldehydes to $\Delta^5$-dihydropyran-2-carboxylic acid esters of $\Delta^5$-dihydropyran-2-carbinols by action thereon of an alcoholate of a polyvalent metal of the second period of the periodic table of the elements, may be subjected to the hereinafter described polymerization process and that the mixture thereby may be polymerized and that improved and novel polymers may thereby be obtained. A signal advantage of the process thus provided, in addition to the desirable qualities of the resulting polymers, is that the process including preparation of the monomeric ester is conducted entirely in liquid phase, and that intervening recovery or separation of the monomeric ester from the reaction mixture in which it is produced, is avoided. It will be evident that this is an advantage of considerable technical importance since expensive procedures requiring complex equipment directed to monomer purification (for example, fractional distillation conducted in fractionating stills) are avoided. While the mixtures resulting from the condensation of the dihydropyran aldehyde contain in predominating amounts the ester formed by its condensation, that is, the ester of the dihydropyranyl carbinol with the dihydropyran carboxylic acid wherein the dihydropyranyl groups are the same as the dihydropyranyl group of the initial aldehyde, such mixtures generally contain, in addition to minor amounts of the starting material, small amounts of possible products of side reaction, as well as residual traces of the polyvalent metal alcoholate catalyst. It appears possible that by polymerizing the entire mixture, copolymers may be formed.

While the liquid phase process described immediately above forms a preferred feature of the invention, in its generic aspects the invention includes as well separating the ester from the reaction mixture as by fractional distillation or other suitable methods. The separated ester may be employed as an intermediate for the preparation, as by ester interchange, of other esters polymerizable according to the present generic invention, or it may be polymerized as hereinafter described to obtain useful polymers.

According to the present invention, new and useful polymers are prepared by polymerizing, alone and also conjointly with other polymerizable unsaturated compounds, hereinbefore and hereinafter disclosed ethylenic carboxylic acid esters of dihydropyranyl-substituted carbinols by subjecting the monomeric esters or mixtures of the monomeric esters with other polymerizable unsaturated compounds, to the action of agents effective in causing polymerization through carbon-to-carbon unsaturated bonds. Generally speaking, agents which may be employed comprise light, especially the ultraviolet, ozone, oxygen, peroxides both organic and inorganic, and polymerization catalysts of the type referred to and known in the art as Friedel-Crafts catalysts. As organic peroxides, there may be mentioned benzoyl peroxide, dibutyryl peroxide, acetal peroxides, di(tertiary alkyl) peroxides disclosed in U. S. Patent 2,426,476 to Vaughan and Rust, as well as other suitable peroxides.

Preferred catalysts, especially for the preparation of polymers of 2-($\Delta^5$-dihydropyranyl)-methyl $\Delta^5$-dihydropyran-2-carboxylate and of its substitution products, are those catalysts that may be generally defined as the Friedel-Crafts catalysts.

Examples of Friedel-Crafts catalysts are aluminum chloride, zinc chloride, ferric chloride, boron trifluoride, antimony pentachloride, stannic chloride, titanium tetrachloride, and the corresponding compounds of other halogens, especially bromine. Complexes of these halides with organic compounds, such as benzene and aliphatic ethers, may be used. The complexes may be added to the reaction mixture in a preformed state, or they may be formed in the polymerization mixture. Halides, preferably chlorides and bromides, of elements whose hydroxides are amphoteric and, if capable of existing in more than one valence level, which are at a valence level at which the hydroxide is amphoteric, may be used as the catalyst. Zinc chloride and aluminum chloride are particularly efficacious as the polymerization catalyst. As little as 0.1% or less of the catalyst may be used and as much as 15% may be present, based on the weight of the monomer. Amounts of the catalyst from about 0.1% to about 5% by weight of the monomer or monomer mixture are preferred.

Mixtures of polymerization catalysts may be used. The polymerization may be initiated with the aid of one catalyst, and further polymerization may be carried out with the aid of another, subsequently applied.

The polymerization process may be carried out at temperatures from as low as about $-70°$ C. to as high as about 200° C., depending upon the particular monomer or mixture of monomers, the catalyst that is used, and its amount, the presence or absence of diluents or solvents, etc., and a preferred range of temperatures is from about 15° C. to about 100° C. The polymerization reaction tends to be exothermic. In the initial phase of the polymerization it is desirable to maintain the temperature of the polymerizing mixture within reasonable values. This may be accomplished, if the liberated heat otherwise would unduly raise the temperature of the polymerizing mixture, by controlled addition of the catalyst in either a continuous or intermittent manner, by dilution of the monomeric mixture with a solvent, by appropriate cooling of the mixture, or in other suitable ways. After the initial reaction has subsided, it may be desired to apply heat to the polymerization mixture from an external source in order to effect more complete polymerization of the monomer and/or partial polymers. Such further polymerization may be accomplished at temperatures within the range of about 30° C. to about 350° C., preferably from about 50° C. to about 175° C. Application of heat, if any, may be carried out with the polymer or partial polymer in the same reaction vessel in which the polymerization was initiated or heat may be applied as a separate operation distinct from the initial polymerization, as in a molding or casting operation, in a baking operation or the like.

The polymerization is usually effected according to known procedures. The monomeric esters, or mixtures thereof with unsaturated compounds copolymerizable therewith, can be polymerized in bulk in the absence of solvents or diluents to form resins. Polymerization can be effected in solution in a substance which is a solvent for the monomer, but not for the polymer, or in the case of soluble polymers, the solvent or diluent medium may also retain the polymer in solution. Partially polymerized soluble polymers may be formed in solution and subsequently the solvent may be removed and by further polymerization the soluble polymer converted to insoluble polymer. Polymers may be formed by polymerization in dispersion in a non-solvent, and the dispersion may be either a true emulsion or, more desirably, an impermanent suspension. Polymerization of the monomeric ethylenic carboxylic acid esters of 2-($\Delta^5$-dihydropyranyl) carbinols, and of their partially polymerized polymers, may be effected in the site of their intended application; for example, fabrics, textiles, paper, and the like, may be impregnated with the monomeric compound or a partial polymer thereof, and polymerization accomplished in situ. Films, as adhesives, may be polymerized in situ. In other cases, it may be desirable to effect the polymerization with the ester or a product of its partial polymerization in the form of a thin sheet or pellicle which may be subsequently stripped from the surface on which it has been applied, or may be allowed to remain on the surface and thereby serve as a protective or decorative coating therefor.

Polymers of the invention may be prepared in the form of intermediate, partially polymerized products, which can be subsequently further polymerized to form the final completely polymerized resin. The subsequent polymerization may be effected in a mold, under heat and pressure if desired, to form formed, molded, or cast hard objects. The products of the invention are characterized by high optical clarity and by freedom from odor and taste, and can be prepared in colorless form. They have an excellent resistance to water, even at its boiling temperature, and solids insoluble and unaffected by the common organic solvents can be obtained. Products of the invention also are characterized by excellent stability at elevated temperatures, being unaffected by temperatures above those detrimental to many transparent resins heretofore produced. Their resistance to heat and to water and solvents renders the solid resinous products of the invention suitable for exacting and rigorous uses, requirements of which have been difficult to meet with heretofore available products.

The following examples will illustrate certain of the specific embodiments of the invention. It will be understood that the examples are intended to be illustrations of the invention and not limitations thereon, as it is more broadly defined in the hereto appended claims. In the examples the parts are by weight unless otherwise stated.

Example I

In this example, there is illustrated a preferred embodiment of the invention whereby polymers are obtained. To 2127 parts of 2-formyl-$\Delta^5$-dihydropyran in a water-jacketed vessel, there was added 0.25% by weight of aluminum isopropoxide in the form of a solution in carbon tetrachloride containing 0.5 gram aluminum isopropoxide per cubic centimeter of solution. The mixture was stirred to distribute the aluminum isopropoxide throughout and then allowed to stand. Gentle evolution of heat warmed the mixture to 35° C. to 40° C., and the temperature thereafter was maintained in this range by cooling as required. After four hours, a portion of the cooled solution was withdrawn and fractionally distilled. 2-($\Delta^5$-dihydropyranyl) methyl $\Delta^5$-dihydropyran-2-carboxylate was recovered from the test aliquot as a fraction distilling at 115° C. to 122° C. under 0.04 millimeters mercury presssure in an amount representing a 74% conversion of the formyl dihydropyran to ester.

The remaining portion of the reaction mixture was a completely colorless liquid containing a trace of suspended solids. A small amount of diatomaceous earth was added to it, to assist in the subsequent filtration, and the mixture was filtered. To the clear filtrate there was added a solution of 2% of its weight of zinc chloride in the form of a solution in diethyl ether containing 0.1 gram zinc chloride per cubic centimeter of ether. The mixture warmed slightly and was allowed to stand at 25° C. to 30° C. for two hours, and then was heated at 70° C. for one hour. A hard, transparent, substantially colorless insoluble resin was thereby produced.

Example II

*Preparation of monomer.*—Five hundred parts of 2-formyl-$\Delta^5$-dihydropyran were placed in a reaction vessel provided with cooling means. To the vessel were added 2.5 parts of aluminum isopropoxide and the mixture was maintained by suitable cooling at about 30° C. for four hours. Upon distillation of the resulting mixture 2-($\Delta^5$-dihydropyranyl) methyl $\Delta^5$-dihydropyran-2-carboxylate was recovered in a yield of 75% of theory as the fraction distilling between 115° C. and 125° C. under a pressure of 0.5 millimeter of mercury.

Example III

*Polymerization of the monomer.*—To 10 parts of the ester prepared in Example II, there was added $\frac{1}{10}$ part of zinc chloride. The salt appeared to be insoluble in the ester and settled to the bottom of the vessel. The mixture of the ester and the zinc chloride was allowed to remain at room temperature for 4 days during which time the viscosity of the ester increased appreciably. The mixture then was heated at 70° C. for 16 hours. The resulting polymer was a clear, completely colorless solid characterized by toughness and resistance to fracture upon bending. The polymer was of such a hardness that it could be dented with a pencil point under pressure.

Example IV

In this experiment a solution of zinc chloride in diethyl ether was employed as the catalyst with a resulting reduction in the time required for polymerization. To 10 parts of 2-($\Delta^5$-dihydropyranyl) methyl $\Delta^5$-dihydropyran-2-carboxylate, prepared as in Example II, there was added a solution of 0.05 part of zinc chloride dissolved in 0.2 part of diethyl ether. The mixture was allowed to stand at room temperature for 16 hours and to the resulting thick syrup there was added an additional 0.05 part of zinc chloride dissolved in 0.2 part of diethyl ether. The mixture then was heated at 70° C. for 20 hours. The resulting polymer was a colorless solid having a Barcol hardness of 10-20. The polymer was optically clear. It was found to be unaffected by immersion in benzene, chloroform, methyl ethyl ketone, ethyl acetate and dioxane. No change in the polymer was evident after it had been immersed in boiling water for 16 hours. The polymer was visually unaffected by exposure to heat at a temperature of 200° C.

*Example V*

To 10 parts of the 2-$\Delta^5$-dihydropyranyl)methyl $\Delta^5$-dihydropyran-2-carboxylate there was added $\frac{1}{10}$ part of zinc chloride dissolved in $\frac{1}{10}$ part of diethyl ether. Upon heating the mixture to 70° C. the viscosity increased rapidly. At the end of 30 minutes' heating there was obtained a clear hard solid resin.

*Example VI*

Ten parts of the 2-($\Delta^5$-dihydropyranyl-methyl $\Delta^5$-dihydropyran-2-carboxylate were placed in a reaction vessel equipped with an inlet tube by means of which a gaseous stream could be introduced below the surface of the liquid. A gaseous stream of boron trifluoride entrained in nitrogen was slowly introduced into the liquid monomer with agitation. The temperature increased as a result of the liberation of heat in the polymerization reaction. When the temperature had risen to 30° C., the addition of the boron trifluoride was discontinued. Over a period of 2 hours the solution had changed to a light yellow, soluble soft solid. Heating this product at 70° C. for 20 hours resulted in the formation of a clear light yellow insoluble solid having Barcol hardness of 15-25.

*Example VII*

To a solution of 50 parts of 2-($\Delta^5$-dihydropyranyl)methyl $\Delta^5$-dihydropyran-2-carboxylate in 250 parts of isopentane there was added a solution of 0.11 part of boron trifluoride in 6 parts of diethyl ether. The temperature of the mixture rose to the boiling point of the solvent, which distilled and was condensed in a reflux condenser and returned to the polymerization mixture. As the polymerization proceeded, with refluxing of the isopentane, small white granules of polymer separated from the solution. The reaction was continued with heating as necessary to maintain the mixture at the boiling point of the isopentane until 50 grams of polymer were obtained. The dried product was visually unaffected by prolonged exposure to a temperature of 220° C.

*Example VIII*

*Preparation of monomer.*—To 50 parts of 2-formyl-2,5-dimethyl-$\Delta^5$-dihydropyran there were added with mixing 3 parts of aluminum isopropoxide. The mixture was allowed to stand at room temperature for 16 hours. By distillation of the resulting mixture there was separated a fraction amounting to 37.5 parts and distilling at 110° C. to 116° C. under a pressure of 0.5 millimeters of mercury, corresponding to a 75% conversion to 2-(2,5-dimethyl-$\Delta^5$-dihydropyranyl)-methyl 2,5-dimethyl-$\Delta^5$-dihydropyran-2-carboxylate.

*Example IX*

*Polymerization of the monomer.*—The monomer prepared in Example VIII was treated with boron trifluoride entrained in air according to the method described in Example VI until the temperature of the mixture rose to 31° C. Addition of the catalyst then was discontinued and after 2 hours' standing, the mixture was heated at 70° C. for 2 days. The product was a viscous thick syrup which flowed only slowly at room temperatures and which gave evidence of being highly stable to the action of heat.

*Example X*

Equal parts by volume of 2-($\Delta^5$-dihydropyranyl) methyl $\Delta^5$-dihydropyran-2-carboxylate and of vinyl isobutyl ether were mixed in a glass lined reaction vessel and treated with 0.5% by weight of zinc chloride dissolved in 4 times its weight of diethyl ether. Copolymerization commenced upon the addition of the zinc chloride as evidenced by rise in temperature of the mixture. After 20 minutes, the temperature of the mixture had increased to 60° C. The mixture thereupon was cooled to 30° C. to 40° C. and kept within this range until the polymerization reaction subsided, as evidenced by lessening in the evolution of heat. After the initial phase of the polymerization reaction had subsided, the mixture was heated at 70° C. for 20 hours. The product was an optically clear colorless solid resin, somewhat softer than the polymer prepared in Example I.

Other vinyl alkyl ethers, e. g., methyl vinyl ether, ethyl vinyl ether, propyl vinyl ether and even decyl vinyl ether may be substituted for the vinyl isobutyl ether used in Example X.

Copolymers may be prepared according to the invention by copolymerizing with the ethylenic carboxylic acid esters of 2-($\Delta^5$-dihydropyranyl) carbinols other polymerizable unsaturated organic compounds copolymerizable therewith. Suitable organic compounds copolymerizable with the monomeric esters contain an unsaturated carbon-to-carbon linkage between adjacent carbon atoms. Among such other compounds are included mono-ethylenic compounds, which contain a single polymerizable carbon-to-carbon double bond, of which an important class consists of those compounds containing a vinyl group (CH$_2$=C<) at the terminus of a group of atoms. More specifically, preferred compounds which may be copolymerized with the heterocyclic unsaturated alcohols may be represented by the formula

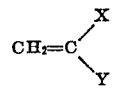

in which X represents hydrogen, halogen, or hydrocarbon, and Y represents a member of the group composed of hydrogen, hydrocarbon, hydrocarbyloxy (—OR*), acyloxy (—OOCR* and —OOCH), carbohydrocarbyloxy (—COOR*), hydrocarbylthio (—SR*), cyano (—CN) and halogen, R* representing hydrocarbon.

Suitable vinylic compounds copolymerizable with the ethylenic carboxylic acid esters of 2-($\Delta^5$-dihydropyranyl) carbinols include unsaturated organic compounds which contain only one unsaturated carbon-to-carbon linkage as well as unsaturated organic compounds which contain more than one carbon-to-carbon unsaturated linkage. Included are both conjugated and unconjugated unsaturated polymerizable compounds. One group of unconjugated unsaturated polymerizable organic compounds copolymerizable with the ethylenic carboxylic acid esters of 2-($\Delta^5$-dihydropyranyl) carbinols consisting of those having but a single polymerizable unsaturated carbon-to-carbon linkage in the molecule. Particular reference may be made to those compounds having a single polymerizable olefinic linkage, examples of which are styrene, substituted styrenes, vinyl esters of saturated monocarboxylic acids, such as vinyl acetate, vinyl propionate, vinyl butyrate, vinyl valerate, vinyl benzoate, vinyl hexanoate, etc., saturated esters of unsaturated monocarboxylic acids, such as methyl methacrylate, ethyl alpha-chloroacrylate, methyl acrylate, ethyl acrylate, chloroethyl methacrylate, etc., allyl esters of saturated monocarboxylic acids, such as allyl acetate, allyl propionate, allyl butyrate, allyl isobutyrate, beta-methallyl acetate, beta-chloroallyl acetate, beta-ethylallyl formate, beta-phenylallyl acetate, beta-chloromethylallyl acetate, allyl benzoate, allyl glycolate, allyl methoxyacetate, beta-methallyl chloroacetate, chloroallyl lactate, allyl ethoxyformate, allyl esters of hydrogenated abietic acid, etc. Other suitable unsaturated organic compounds containing but a single unsaturated carbon-to-carbon linkage in the molecule include halogenated ethylenic hydrocarbons, such as vinyl chloride, vinyl bromide, vinylidene chloride, vinylidene bromide, 1-chloropropene-1, allyl chloride, allyl bromide, methallyl chloride, crotonyl bromide, isopropenyl chloride, unsaturated alcohol ethers of saturated aliphatic monohydric alcohols, such as the vinyl alkyl ethers, the allyl and substituted allyl alkyl ethers, vinylic sulfides, etc.

Another important group of unconjugated polymerizable compounds consists of those having two or more non-conjugated polymerizable unsaturated carbon-to-carbon linkages in the molecule. The carbon atoms interconnected by such non-conjugated double bonds thus will be linked only to atoms which are directly linked to other carbon atoms by single bonds only. Esters of olefinic alcohols, e. g., alpha, beta-olefinic alcohols, such as vinyl alcohol and substituted vinyl alcohols, and of beta, gamma-olefinic alcohols, such as allyl alcohol and substituted allyl alcohols, with polybasic, preferably aromatic acids form an important subgroup. Illustrative members of this subgroup include, among others, divinyl oxalate, diallyl phthalate, dimethallyl malonate, vinyl allyl citrate, dimethallyl phthalate, bis(2-chloroallyl) phthalate, dimethallyl tetrachlorophthalate, chloroallyl vinyl phthalate, diisopropenyl phthalate, crotyl vinyl phthalate, and other diesters of olefinic alcohols with other polycarboxylic acids, such as glutaric, adipic, pimelic, suberic, azelaic, sebacic, tricarbyllylic and related polycarboxylic acids. Esters of unsaturated aliphatic monohydric alcohols with unsaturated aliphatic monocarboxylic acids are further examples of compounds containing two or more unsaturated carbon-to-carbon linkages unconjugated with respect to one another and copolymerizable with the ethylenic carboxylic acid esters of 2-($\Delta^5$-dihydropyranyl) carbinols according to the invention. Examples of these compounds are the vinyl, allyl, methallyl and homologous and analogous esters of acrylic, methacrylic, crotonic, chloroacrylic, itaconic, tiglic, and cinnamic acids. Another valuable subclass consists of the unsaturated aliphatic polyethers of saturated polyhydric alcohols, such as the polyvinyl, polyallyl, and polymethallyl ethers of glycol, diethylene glycol, triethylene glycol, trimethylene glycol, pentaerythritol, glycerol, mannitol, sorbitol, and like alcohols involving two or more of the hydroxyl groups. Instead of the esters and ethers aforementioned, the corresponding sulfur and nitrogen compounds, i. e., thioethers, thioesters and amides, may be employed. A further class of nitrogen-containing unsaturated compounds which may be copolymerized with the ethylenic carboxylic acid esters of 2-($\Delta^5$-dihydropyranyl) carbinols are nitriles of olefinic aliphatic monocarboxylic acids, such as acrylonitrile, methacrylonitrile, alpha-chloroacrylonitrile, beta-chloroacrylonitrile, alpha-ethylacrylonitrile and alpha-chloromethylacrylonitrile. The most important compounds copolymerizable with the esters of 2-($\Delta^5$-dihydropyranyl) carbinols herein disclosed are those containing oxygen, particular reference being made to the unsaturated ethers and the unsaturated esters.

Copolymers containing from 5% by weight to 98% by weight of the ethylenic carboxylic acid esters of 2-($\Delta^5$-dihydropyranyl) carbinols may be prepared. Preferred copolymers containing from about 98% to about 60% of the ethylenic carboxylic acid ester of the 2-($\Delta^5$-dihydropyranyl) carbinols based upon the combined weight of the copolymerized monomers. However, in certain cases smaller proportions of the dihydropyranyl carbinol ester may be employed advantageously. For example, synthetic rubbers having improved characteristics may be prepared by copolymerizing known mono-olefinic and diolefinic hydrocarbons which by polymerization according to known procedures can be converted to rubber-like polymers, such as butadiene, methylpentadiene, isoprene, butene, isobutene, styrene, or mixtures thereof with from as little as 1% up to about 25% by weight of 2-($\Delta^5$-dihydropyranyl)-methyl$\Delta^5$-dihydropyran-2-carboxylate or a substituted 2-($\Delta^5$-dihydropyranyl)methyl$\Delta^5$-dihydropyran-2-carboxylate.

When it is desired to prepare copolymers, the monomers may be mixed and polymerized conjointly without further addition of either monomer. In other cases, as when the selected monomers polymerize at different rates, the monomer having the lower rate of polymerization may be mixed with a portion of the monomer having the higher rate of polymerization, and as polymerization progresses further portions of the latter may be added to the polymerizing mixture. The addition may be continuous or intermittent, and desirably may be at such a rate that the ratio between the two monomers in the mixture remains constant throughout the polymerization.

The solid resinous polymers of the invention can be produced in the form of sheets, rods, tubes and filaments, and the like.

They make desirable ternary resins.

They can be cast in an infinite variety of shapes and cast objects prepared therefrom not only may be optically clear and colorless, but they may have improved resistance to the effects of water, organic solvents, and elevated temperatures.

Polymers of the invention may be compounded, as at a stage of partial polymerization, with modifying agents, such as plasticizers, dyes, pigments, fillers, waxes, natural or synthetic drying oils, natural or synthetic resins, and subsequently polymerized further.

Partially polymerized products of the invention can be subjected to injection and compression molding in the presence or absence of added diluents, fillers, plasticizers, dyes, pigments, and the like, and the thus-formed objects further cured as by heat. Softer, tougher polymers of the invention are suited to the preparation of laminated structures such as laminated paper and/or cloth structures. The laminates display excellent resistance to the action of solvents and of water, and may be used, for example, as flexible liners of containers for solvents and/or water, as surface coverings, such as coverings on table tops, work benches, desks, etc. Cloth impregnated with polymers of the invention may be used in the making of protective clothing, such as raincoats, gloves, hats, etc. Some of the polymers form tough, adherent flexible coatings and therefore may be employed as protective surface coatings and as improved adhesive materials. In the form of sheets, alone or, preferably, supported upon an open-mesh framework polymers of the invention may be used as substitutes for glass. As the intermediate, adhesive layer or layers between two or more laminae or sheets of glass they may be employed in the fabrication of shatterproof or safety glass.

Partially polymerized products of the invention are of additional interest as intermediates for the preparation of improved plasticizers, tackifiers, and the like. Catalytic hydrogenation of such intermediate polymers as by treatment thereof with molecular hydrogen under superatmospheric pressure and in the presence of a hydrogenation catalyst forms valuable liquid to soft solid, to hard resinous solids which may be used in a variety of applications. The hydrogenation may be carried out in the presence or absence of solvents, as desirable, and at an elevated temperature. The hydrogenated products do not tend to polymerize further. Liquid hydrogenated polymers of the invention thus are of value as ingredients in the compound of printing inks, as plasticizers for natural and synthetic resins and for cellulosic derivatives and they also may be used as synthetic lubricants for special applications.

I claim as my invention:

1. Polymeric 2-($\Delta^5$-dihydropyranyl)methyl $\Delta^5$-dihydropyran-2-carboxylate.
2. Homopolymeric 2-($\Delta^5$-dihydropyranyl)methyl $\Delta^5$-dihydropyran-2-carboxylate.
3. A copolymer of 2-($\Delta^5$-dihydropyranyl)methyl $\Delta^5$-dihydropyran-2-carboxylate and a vinyl alkyl ether.
4. A copolymer of 2-($\Delta^5$-dihydropyranyl)methyl $\Delta^5$-dihydropyran-2-carboxylate and a polymerizable organic compound containing a $CH_2=C<$ group.
5. A molding composition comprising a fusible heat-hardenable polymeric 2-($\Delta^5$-dihydropyranyl)methyl $\Delta^5$-dihydropyran-2-carboxylate and a polymerization catalyst.
6. A transparent, hard formed composition matter composed essentially of polymeric 2-($\Delta^5$-dihydropyranyl)methyl $\Delta^5$-dihydropyran-2-carboxylate.
7. A polymeric ester of a 2-($\Delta^5$-dihydropyranyl) carbinol and a $\Delta^5$-dihydropyranyl-2-carboxylic acid.
8. A polymer of a polymerizable ethylenic carboxylic acid ester of 2-($\Delta^5$-dihydropyranyl) carbinol.
9. A polymer of a polymerizable ethylenic carboxylic acid ester of a carbinol having a hydrogen atom of the carbinol group substituted by a 2-($\Delta^5$-dihydropyranyl) radical composed, except for the nuclear oxygen atom, of atoms of carbon and hydrogen only.
10. A process of preparing polymers which comprises polymerizing in the presence of a Friedel-Crafts catalyst 2-($\Delta^5$-dihydropyranyl)-methyl $\Delta^5$-dihydropyran-2-carboxylate.
11. A process of preparing copolymers which comprises conjointly polymerizing in admixture 2-($\Delta^5$-dihydropyranyl)methyl $\Delta^5$-dihydropyran-2-carboxylate and a polymerizable organic compound containing a $CH_2=C<$ group.
12. An ester of the formula

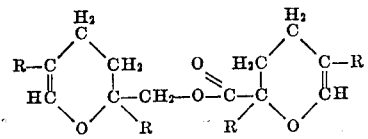

in which R represents lower alkyl.

13. 2-($\Delta^5$-dihydropyranyl)methyl $\Delta^5$-dihydropyran-2-carboxylate.
14. A polymeric 2-(2,5-dialkyl-$\Delta^5$-dihydropyranyl)methyl 2,5-dialkyl-$\Delta^5$-dihydropyran-2-carboxylate.
15. A process for preparing polymers which comprises polymerizing 2-($\Delta^5$-dihydropyranyl)-methyl $\Delta^5$-dihydropyran-2-carboxylate by treatment thereof in the liquid phase with zinc chloride.
16. A process of preparing polymers which comprises polymerizing in the presence of a Friedel-Crafts catalyst a polymerizable ethylenic carboxylic acid ester of a $\Delta^5$-dihydropyran-2-carbinol, said $\Delta^5$-dihydropyran-2-carbinol being composed, except for the nuclear oxygen atom and the oxygen atom of the carbinol group, of atoms of carbon and hydrogen only.
17. A process of preparing polymers which comprises condensing 2-formyl-$\Delta^5$-dihydropyran in liquid phase in the presence of aluminum isopropoxide, filtering the resulting liquid mixture and polymerizing the filtrate in the presence of a Friedel-Crafts catalyst.
18. A process of preparing polymers which comprises condensing a 2-formyl-$\Delta^5$-dihydropyran in liquid phase in the presence of an alcoholate of a polyvalent metal of the Second Period of the Periodic Table of the Elements and polymerizing the resulting liquid mixture in the presence of a Friedel-Crafts catalyst, said 2-formyl-$\Delta^5$-dihydropyran being composed, except for the nuclear oxygen atom and the oxygen atom of the formyl group, of atoms of carbon and hydrogen only.
19. Polymeric 2-(2,5-dimethyl-$\Delta^5$-dihydropyranyl)methyl 2,5-dimethyl-$\Delta^5$-dihydropyran-2-carboxylate.
20. A viscous liquid composed essentially of homopolymeric 2-(2,5-dimethyl-$\Delta^5$-dihydropyranyl)methyl 2,5-dimethyl-$\Delta^5$-dihydropyran-2-carboxylate.

CURTIS W. SMITH.

REFERENCES CITED

The following references are of record in the file of this patent:

UNITED STATES PATENTS

| Number | Name | Date |
|---|---|---|
| 2,129,666 | Barrett | Sept. 13, 1938 |
| 2,129,667 | Barrett | Sept. 13, 1938 |
| 2,378,996 | Freure | June 26, 1945 |
| 2,436,645 | Hawkins | Feb. 24, 1948 |

OTHER REFERENCES

Chemical Abstracts, vol. 32 page 5398 (1938), vol. 38, page 2339 (1944); vol. 41, page 964 (1947).